United States Patent
Milton

(10) Patent No.: US 8,300,782 B2
(45) Date of Patent: Oct. 30, 2012

(54) SECURE FEATURE ACCESS FROM AN OFF-PBX TELEPHONE

(75) Inventor: Stephen M. Milton, Freehold, NJ (US)

(73) Assignee: Avaya Inc., Basking Ridge, NJ (US)

( * ) Notice: Subject to any disclaimer, the term of this patent is extended or adjusted under 35 U.S.C. 154(b) by 909 days.

(21) Appl. No.: 12/390,108

(22) Filed: Feb. 20, 2009

(65) Prior Publication Data

US 2010/0215159 A1 Aug. 26, 2010

(51) Int. Cl.
*H04M 11/00* (2006.01)
(52) U.S. Cl. .......... 379/93.02; 379/198; 379/88.02; 379/220.01
(58) Field of Classification Search .......... 379/93.02, 379/88.02, 114.14, 114.15, 189, 220.01, 379/221.08, 221.09
See application file for complete search history.

(56) References Cited

U.S. PATENT DOCUMENTS

| | | | |
|---|---|---|---|
| 6,750,896 B2 * | 6/2004 | McClure | 348/14.01 |
| 7,200,218 B1 * | 4/2007 | Lindley et al. | 379/221.11 |
| 7,702,086 B2 * | 4/2010 | Susen et al. | 379/93.02 |
| 2008/0072294 A1 * | 3/2008 | Chatterjee | 726/4 |

FOREIGN PATENT DOCUMENTS

| | | |
|---|---|---|
| EP | 0939536 | 9/1999 |
| EP | 1467545 | 10/2004 |
| WO | WO 97/18662 | 5/1997 |
| WO | WO 01/35616 | 5/2001 |

OTHER PUBLICATIONS

Extended European Search Report for European Patent Application No. 09171603.5, dated Jun. 22, 2010.

* cited by examiner

*Primary Examiner* — Melur Ramakrishnaiah
(74) *Attorney, Agent, or Firm* — Sheridan Ross P.C.

(57) ABSTRACT

A security plan for telephone clients allows the client to authenticate itself by sending a coded sequence of DTMF digits to a PBX at the beginning of each call. When the idle client telephone receives a call, it sends a coded DTMF sequence to the PBX. If the client makes a feature invoking call to the PBX while active on the first call, the client will be prompted for the security sequence. The client must send the same sequence of DTMF digits as for the first call. The first call is authenticated by virtue of being a call from the PBX to the telephone. The second call is authenticated by sending a DTMF sequence that matches the one sent with the first call. A call that fails authentication is dropped. The security plan for clients constrains the client to using a callback to originate a call from an idle telephone.

20 Claims, 4 Drawing Sheets

SECURE FEATURE ACCESS FROM AN OFF-PBX TELEPHONE

FIELD OF THE INVENTION

An exemplary embodiment of this invention relates to communications devices, protocols and techniques. More specifically, an exemplary aspect of this invention relates to accessing secure features from an off-PBX telephone.

BACKGROUND

Unified communications applications provide greater efficiency for workers whether they are at their desk, mobile, or working from a remote location. Solutions such as Avaya's' oneX™ portal manages various communications applications and services with a communication manager, an application enablement service, a portal server, media exchange enterprise applications, mobile messaging applications, licensing and active directory support.

SUMMARY

One benefit of unified communications is the ability to use mobile solutions for accessing desktop telephone functionality. Available solutions can associate an external telephone with a PBX extension by setting up a table of external-number PBX-extension pairs. When an external call enters the PBX via a trunk with a caller ID, the calling number is looked-up in the table and the corresponding extension obtained. The trunk call can be made to look like it comes from the PBX extension. Due to the provision of special feature-direct-dialing numbers, the external telephone can be given access to PBX features, using the persona of the associated BPX extension.

However, the calling number is a weak form of caller identification. Standards vary widely with regard to what may be passed as the calling number. Although there is a standard for indicating whether a calling number is from a network sanctioned device, many (small) providers "bless" any number provided by their users as their desired calling number. Therefore, it is possible to spoof the calling number of a telephone that is paired with a PBX extension allowing unlawful access to PBX features via that extension.

Some solutions to address this problem are to restrict access to calling numbers that are network certified however this may not be foolproof. Another approach is to require a login where a user enters their extension and password to obtain access to PBX features. Research in Motion uses DTMF to exchange information between a Blackberry® (PDA) client and server in the absence of a data connection. Part of the exchange is used to verify that a call sent from the server was received at the client. The Blackberry® device never has more than one physical call active at a time. It does not cross-validate calls as coming from the same device and does not create its own coded sequences, but receives them from the server.

In accordance with one exemplary embodiment of the present invention, secure access to PBX features is provided in that a telephone client creates authentication sequences autonomously without externally introduced password and/ or keys.

More specifically, an exemplary embodiment of this invention utilizes a telephone client with the following capabilities:

1) when idle (no voice calls), the client can establish a data connection to a server. The server has the ability to set up and route calls through a PBX.

2) The client can use the telephone interface of the telephone to make calls.

Therefore, in accordance with an exemplary embodiment of the present invention, a security plan for telephone clients is for the client to authenticate itself by sending a coded sequence of DTMF digits to the PBX at the beginning of each call. When the idle client telephone receives a call, it sends a coded DTMF sequence to the PBX. If the client makes a feature invoking call to the PBX while active on the first call, the client will be prompted for the security sequence. The client must send the same sequence of DTMF digits as for the first call. The first call is authenticated by virtue of being a call from the PBX to the telephone. The second call is authenticated by sending a DTMF sequence that matches the one sent with the first call. A call that fails authentication is dropped. The security plan for telephone clients constrains the client to using a callback to originate a call from an idle telephone. This plan can be restricted to feature numbers; it does not necessarily have to affect calls directly to a destination on the PBX.

The telephone client is responsible for creating a new random sequence when it receives a call at an idle telephone. This sequence comprises, for example, the DTMF digit "A," four digits from 0-9, and the DTMF digit "D." The digits "A" and "D" are special digits that cannot be dialed by a user. Because of the special digits the random sequence sent from the telephone client cannot be confused with a user generated sequence.

Accordingly, exemplary aspects of this invention are directed toward PBX feature access. More specifically, exemplary aspects of the invention are directed toward secure feature access from an off-PBX telephone.

Additional aspects of the invention extend these techniques to SIP-based communications environments, allowing authentication via an XML attachment.

Still further aspects of the invention relate to a telephone client authentication sequence using coded DTMF digits.

Still further aspects of the invention relate to comparing a sequence of DTMF digits to authenticate a client.

Still further aspects of the invention relate to constructing a sequence of digits for authentication that include digits that cannot be dialed by a user.

Additional aspects of the invention relate to utilizing a voice channel for authentication of a telephone client.

Still further aspects of the invention relate to utilizing a voice channel for telephone client authentication for secure feature access from an off-PBX telephone.

The present invention can provide a number of advantages depending on the particular configuration. These and other advantages will be apparent from the disclosure of the invention(s) contained herein.

The phrases "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

The term "a" or "an" entity refers to one or more of that entity. As such, the terms "a" (or "an"), "one or more" and "at least one" can be used interchangeably herein. It is also to be noted that the terms "comprising", "including", and "having" can be used interchangeably.

The term "automatic" and variations thereof, as used herein, refers to any process or operation done without material human input when the process or operation is performed.

However, a process or operation can be automatic even if performance of the process or operation uses human input, whether material or immaterial, received before performance of the process or operation. Human input is deemed to be material if such input influences how the process or operation will be performed. Human input that consents to the performance of the process or operation is not deemed to be "material."

The term "computer-readable medium" as used herein refers to any tangible storage and/or transmission medium that participate in providing instructions to a processor for execution. Such a medium may take many forms, including but not limited to, non-volatile media, volatile media, and transmission media. Non-volatile media includes, for example, NVRAM, or magnetic or optical disks. Volatile media includes dynamic memory, such as main memory. Common forms of computer-readable media include, for example, a floppy disk, a flexible disk, hard disk, magnetic tape, or any other magnetic medium, magneto-optical medium, a CD-ROM, any other optical medium, punch cards, paper tape, any other physical medium with patterns of holes, a RAM, a PROM, and EPROM, a FLASH-EPROM, a solid state medium like a memory card, any other memory chip or cartridge, a carrier wave as described hereinafter, or any other medium from which a computer can read. A digital file attachment to e-mail or other self-contained information archive or set of archives is considered a distribution medium equivalent to a tangible storage medium. When the computer-readable media is configured as a database, it is to be understood that the database may be any type of database, such as relational, hierarchical, object-oriented, and/or the like.

While circuit or packet-switched types of communications can be used with the present invention, the concepts and techniques disclosed herein are applicable to other protocols.

Accordingly, the invention is considered to include a tangible storage medium or distribution medium and prior art-recognized equivalents and successor media, in which the software implementations of the present invention are stored.

The terms "determine," "calculate" and "compute," and variations thereof, as used herein, are used interchangeably and include any type of methodology, process, mathematical operation or technique.

The term "module" as used herein refers to any known or later developed hardware, software, firmware, artificial intelligence, fuzzy logic, or combination of hardware and software that is capable of performing the functionality associated with that element. Also, while the invention is described in terms of exemplary embodiments, it should be appreciated that individual aspects of the invention can be separately claimed.

The preceding is a simplified summary of the invention to provide an understanding of some aspects of the invention. This summary is neither an extensive nor exhaustive overview of the invention and its various embodiments. It is intended neither to identify key or critical elements of the invention nor to delineate the scope of the invention but to present selected concepts of the invention in a simplified form as an introduction to the more detailed description presented below. As will be appreciated, other embodiments of the invention are possible utilizing, alone or in combination, one or more of the features set forth above or described in detail below.

DETAILED DESCRIPTION

The invention will be described below in relation to a communications environment. Although well suited for use with circuit-switched or packet-switched networks, the invention is not limited to use with any particular type of communications system or configuration of system elements and those skilled in the art will recognize that the disclosed techniques may be used in any application in which it is desirable to provide secure feature access. For example, the systems and methods disclosed herein will also work well with SIP-based communications systems and endpoints. Moreover, the various endpoints described herein can be any communications device such as a telephone, speakerphone, cellular phone, SIP-enabled endpoint, softphone, PDA, wired or wireless communication device, or in general any communications device that is capable of sending and/or receiving voice and/or data communications.

The exemplary systems and methods of this invention will also be described in relation to software, modules, and associated hardware and network(s). In order to avoid unnecessarily obscuring the present invention, the following description admits well-known structures, components and devices that may be shown in block diagram form, are well known, or are otherwise summarized.

For purposes of explanation, numerous details are set forth in order to provide a thorough understanding of the present invention. It should be appreciated however, that the present invention may be practiced in a variety of ways beyond the specific details set forth herein.

Figure 1:
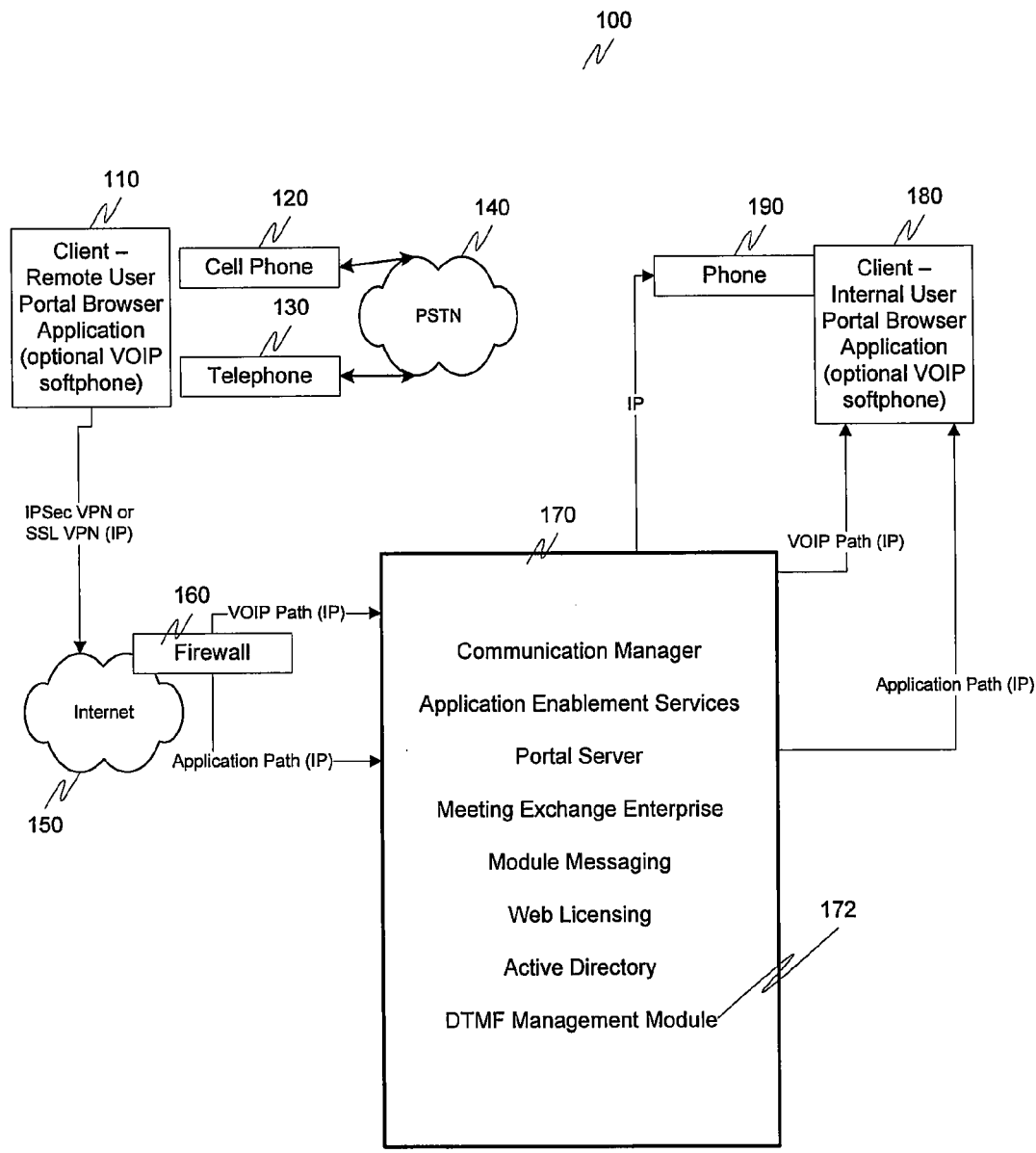
FIG. 1 illustrates an exemplary communications environment according to this invention.

FIG. 1 illustrates an exemplary communications environment 100. This communications environment is similar to the Avaya oneX unified communications solution and includes a remote user client 110, one or more cell phones 120, telephones 130, PSTN 140, Internet 150, firewall 160, Unified communications server 170, an internal user client 180 and an associated phone 190. The various elements can be connected via one or more links, such as IP links that are secure or unsecured via a PSTN, network, such as the Internet, or the like.

Unified communications server 170 includes, for example, a communication manager, application enablement services, a portal server, meeting exchange enterprise services, messaging and licensing services, active directory services, as well as a DTMF management module 172.

As described hereinafter in greater detail, the DTMF management module provides the functionality that allows secure feature access from an off-PBX telephone. The client 110 is a remote user, which can be using, for example, a portal browser application, and optionally a VoIP softphone in conjunction with one or more of the cell phone 120 and telephone 130.

The client 180 is an internal user client that can also use a portal browser application, and optionally a VoIP softphone in conjunction with phone 190. For example, the phone 190 can be a desktop phone associated with client 180.

Figure 2:
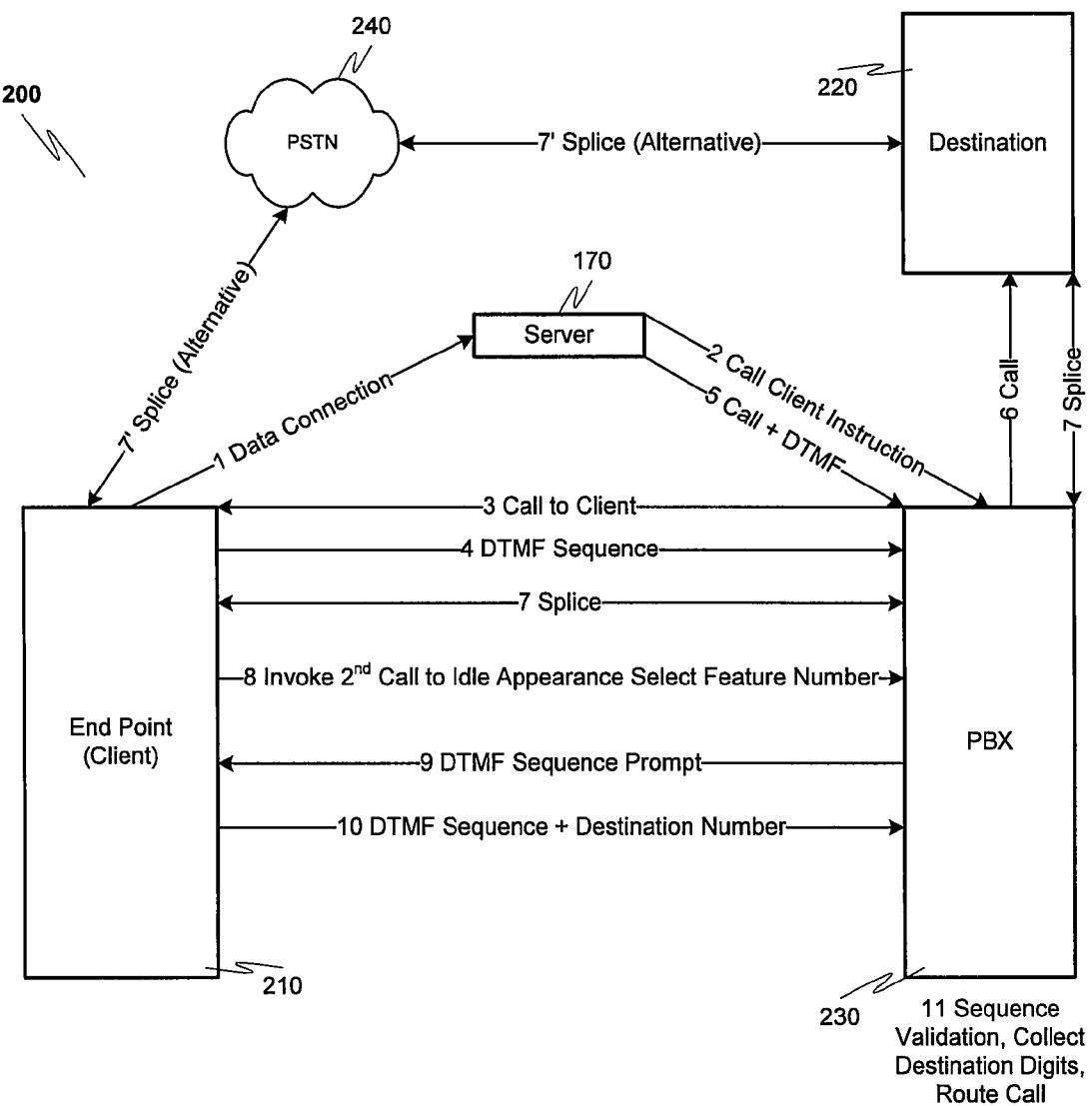
FIG. 2 illustrates an exemplary method for communications client authentication according to this invention.

Operation of the secure feature access from an off-PBX telephone will be described in greater detail in relations to FIGS. 2 and 3. In FIG. 2, an illustrative communications environment 200 is illustrated where a communications sequence is outlined between an endpoint 210, PBX 230 and destination 220 where the authentication is server centric and in FIG. 3 an embodiment where a telephone client in conjunction with a PBX provides the authentication.

More specifically, the communications environment 200 in FIG. 2 includes an endpoint 210, a PBX 230, destination endpoint 220, as well as network 240, such as a PSTN and server 170. To authenticate the off-PBX telephone, e.g., endpoint 210, a user invokes the endpoint 210 to make a call. The endpoint 210 uses a data connection (1) to the server 170 to make the call. Next, the server 170 places a call (2) to the PBX 230 which in turn calls (3) the client 210. The client 210 answers the call and sends a DTMF sequence (4) to the PBX 230. As discussed, the endpoint 210 is responsible for creating a new random sequence when it receives the call (3).

One exemplary embodiment of this sequence includes a DTMF digit A, four digits from 0-9, and the DTMF digit D. The digits A and D are special digits that cannot be dialed by the user at the endpoint 210. While this particular sequence is illustrative of an example of how the sequence can be constructed, it should be appreciated that other sequences can be used and can include different DTMF digits, different sequences of DTMF digits, or the like with greater robustness achieved by using digits that cannot be dialed by the user. In general, any sequence of digits, and any number of digits can be used in conjunction with the various embodiments of the present invention.

Next, the server 170 initiates a call (5) via the PBX 230 to the destination 220 that was identified in the initial data request. The client could have passed the destination digits at step S110, and it is possible that the destination digits could have been passed at a later time. This call, such as a SIP invite, contains the DTMF sequence and the call is associated with the user's desk set, such as destination 220, via an off-PBX station-mapping previously set in server 170.

Next, the PBX 230 saves the sequence and routes the call (6) to the destination 220. For the recipient at destination 220, the call appears to be coming from the user's desk set. Then, the server 170 splices the two calls together via splice (7) or alternatively via splice (7') routed through PSTN 240. Once the splice is complete, the destination 220 can answer the phone and endpoint 210 communicate with destination 220.

Next, the user at endpoint 210 invokes the client to make a second call. The endpoint 210 calls, for example, the idle appearance select feature number (DID number to the PBX) (8). The PBX 230 receives the communication and prompts, for example, via dial-tone, the endpoint 210 for the DTMF sequence (9). The endpoint 210 sends the DTMF sequence followed by the destination number (10) to the PBX 230. The PBX 230 can validate the sequence, since it has previously received the DTMF sequence from the endpoint 210, collect the destination digits and route the call to the destination (11). This allows verification of the endpoint 210 and provides secure access by the endpoint 210 to, for example, a destination such as a secure feature access portion of the communication server 170.

Figure 3:
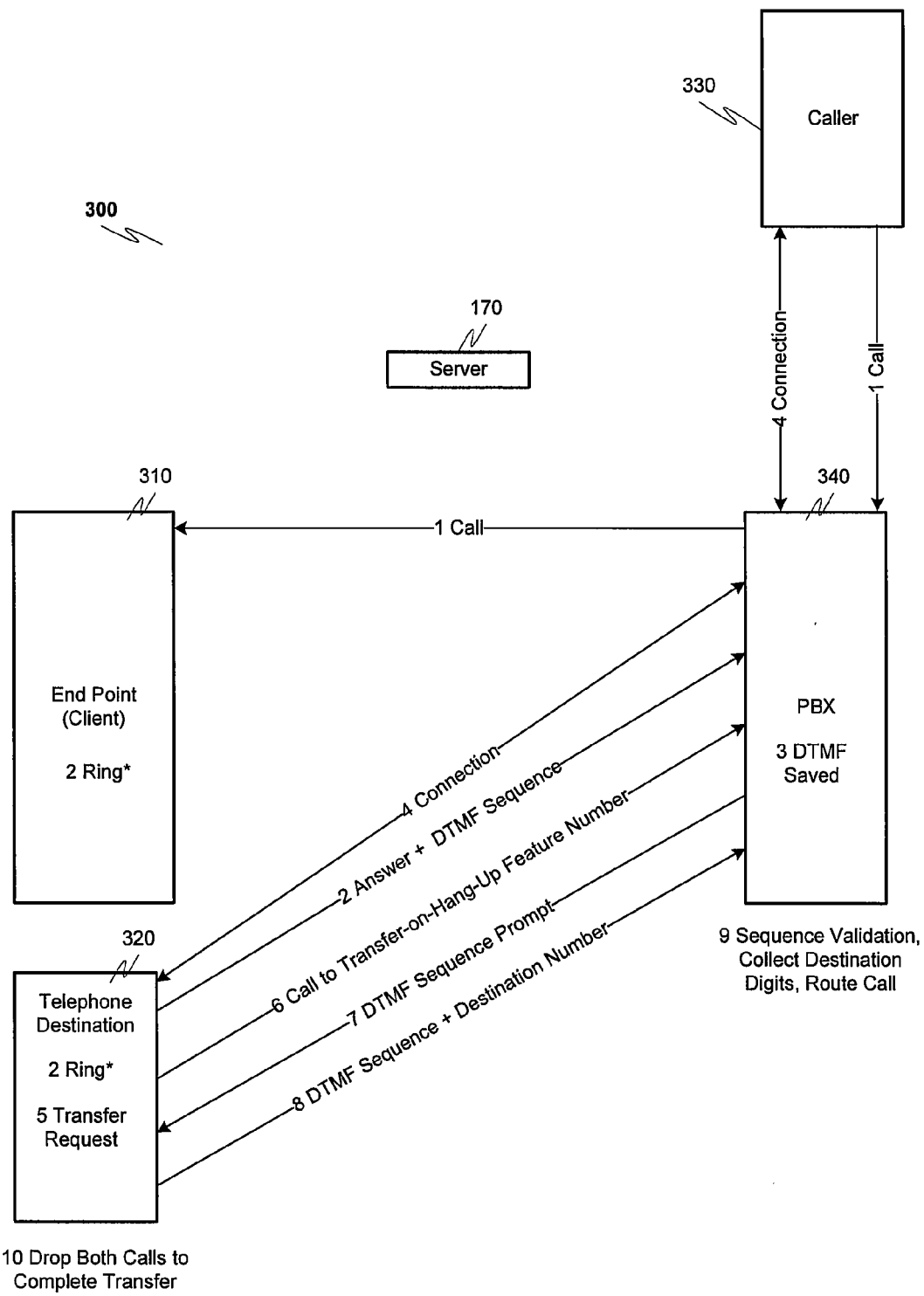
FIG. 3 illustrates an additional embodiment for communication client authentication according to this invention.

Another exemplary embodiment is illustrated in FIG. 3, where the authentication is PBX centric. In the embodiment illustrated in FIG. 3, the communications environment 300 includes an endpoint 310, a destination 320, a caller 330 and a PBX 340. The communications environment 300 may also include a server to assist with general call management, however the server is not needed for endpoint authentication.

In operation, a caller 330 calls (1) the desk set, such as endpoint 310, via the PBX 340. The call (1) rings (2*) the desk set and telephone destination, since an off-PBX station-mapping has been established at server 170. Next, and because of this mapping, the destination telephone 320 answers the call and sends a generated DTMF sequence (2) to the PBX 340. The PBX 340 collects the sequence and saves the DTMF sequence (3).

At this point, a connection (4) is completed and the caller 330 can speak with the destination telephone 320. During the call, the user associated with the destination telephone 320 invokes the client to transfer the call (5). Upon receipt of this transfer request, the client calls, for example, the transfer-on-hang-up feature number (DID number to the PBX) (6). The PBX 340 receives the call and prompts, for example via dial-tone, the destination telephone 320 for the DTMF sequence (7). The destination telephone 320 sends the DTMF sequence followed by the transfer destination number (8) to the PBX 340. The PBX 340 validates (9) the sequence, collects the destination digits and routes the call. At that point, the destination telephone 320 drops both calls, thus completing the transfer.

Figure 4:
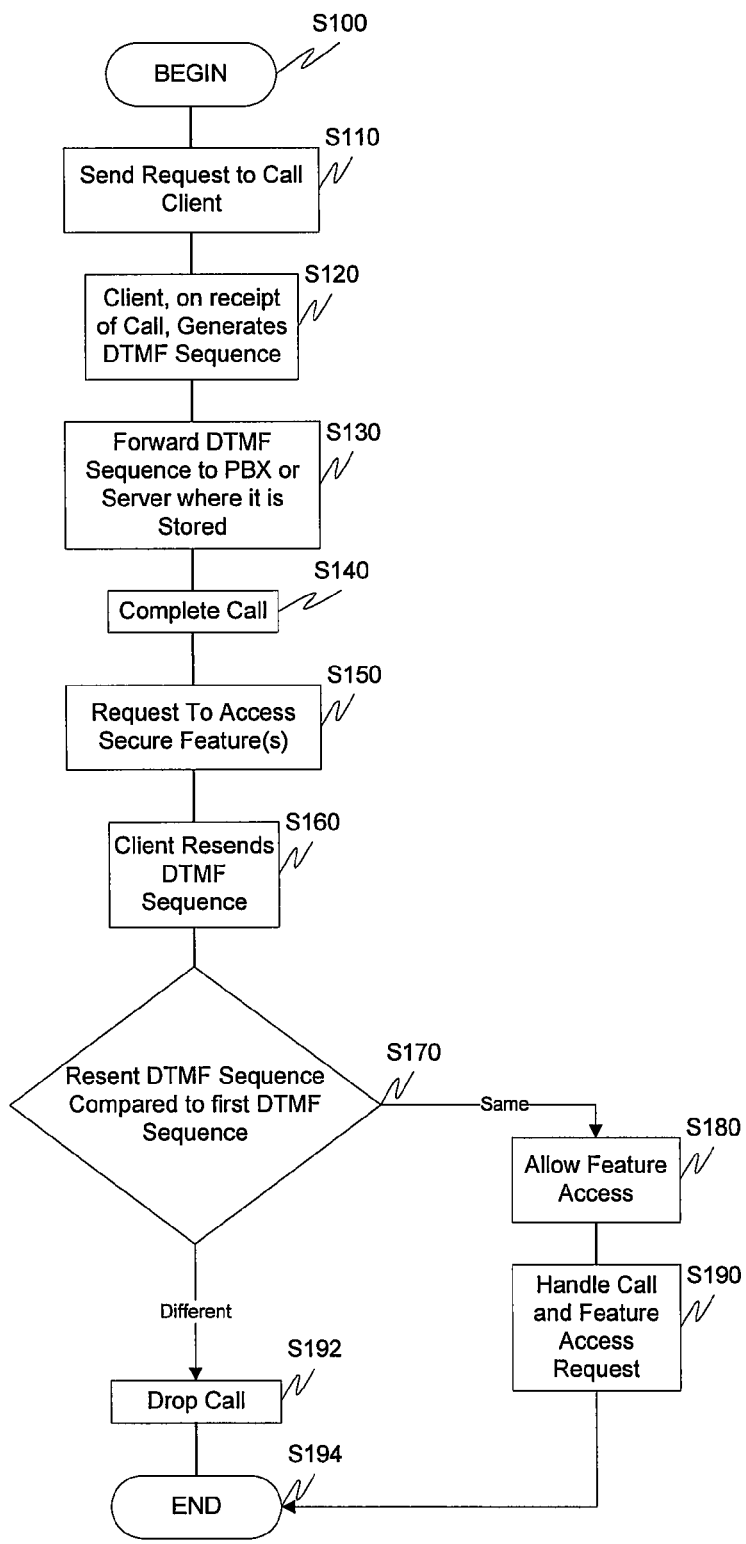
FIG. 4 illustrates an exemplary method for endpoint verification and secure feature access according to this invention.

FIG. 4 outlines an example of endpoint verification and secure feature access according to this invention. Control begins in step S100 and continues to step S110. In step S110, a request to call the client is sent. Next, in step S120, the client, upon receipt of the call, generates a DTMF sequence. Then, in step S130, the generated DTMF sequence is sent to one or more of a server and PBX where it is stored to be used for later verification. Control then continues to step S140.

In step S140, a call to a destination is optionally completed. Next, in step S150, a request to access a secure feature(s) is received. The receipt of the request triggers a request to be sent to the client asking for the DTMF sequence which is then resent in step S160. Then, in step S170, a determination is made whether the resent DTMF sequence is the same as the first, generated DTMF sequence. If the sequences are the same, control jumps to step S180, otherwise control continues to step S192.

In step S180, secure feature access is allowed with the call and feature access operation performed in step S190. Control then continues to step S194 where the control sequence ends.

In step S192, when the DTMF sequences are different, the call is dropped and control continues to step S194 where the control sequence ends.

A number of variations and modifications of the invention can be used. It would be possible to provide or claims for some features of the invention without providing or claiming others.

The exemplary systems and methods of this invention have been described in relation to secure call management. However, to avoid unnecessarily obscuring the present invention, the description omits a number of known structures and devices. This omission is not to be construed as a limitation of the scope of the claimed invention. Specific details are set forth to provide an understanding of the present invention. It should however be appreciated that the present invention may be practiced in a variety of ways beyond the specific detail set forth herein.

Furthermore, while the exemplary embodiments illustrated herein show various components of the system collocated, certain components of the system can be located remotely, at distant portions of a distributed network, such as a LAN, cable network, and/or the Internet, or within a dedicated system. Thus, it should be appreciated, that the components of the system can be combined in to one or more devices, such as a gateway, or collocated on a particular node of a distributed network, such as an analog and/or digital communications network, a packet-switch network, a circuit-switched network or a cable network.

It will be appreciated from the preceding description, and for reasons of computational efficiency, that the components of the system can be arranged at any location within a distributed network of components without affecting the operation of the system. For example, the various components can be located in a switch such as a PBX and media server, gateway, a cable provider, enterprise system, in one or more communications devices, at one or more users' premises, or some combination thereof. Similarly, one or more functional portions of the system could be distributed between a communications device(s) and an associated computing device.

Furthermore, it should be appreciated that the various links, such as link 5, connecting the elements can be wired or wireless links, or any combination thereof, or any other known or later developed element(s) that is capable of supplying and/or communicating data to and from the connected elements. These wired or wireless links can also be secure links and may be capable of communicating encrypted information. Transmission media used as links, for example, can be any suitable carrier for electrical signals, including coaxial cables, copper wire and fiber optics, and may take the form of acoustic or light waves, such as those generated during radio-wave and infra-red data communications.

Also, while the flowcharts have been discussed and illustrated in relation to a particular sequence of events, it should be appreciated that changes, additions, and omissions to this sequence can occur without materially affecting the operation of the invention.

In yet another embodiment, the systems and methods of this invention can be implemented in conjunction with a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device or gate array such as PLD, PLA, FPGA, PAL, special purpose computer, any comparable means, or the like. In general, any device(s) or means capable of implementing the methodology illustrated herein can be used to implement the various aspects of this invention.

Exemplary hardware that can be used for the present invention includes computers, handheld devices, telephones (e.g., cellular, Internet enabled, digital, analog, hybrids, and others), and other hardware known in the art. Some of these devices include processors (e.g., a single or multiple microprocessors), memory, nonvolatile storage, input devices, and output devices. Furthermore, alternative software implementations including, but not limited to, distributed processing or component/object distributed processing, parallel processing, or virtual machine processing can also be constructed to implement the methods described herein.

In yet another embodiment, the disclosed methods may be readily implemented in conjunction with software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with this invention is dependent on the speed and/or efficiency requirements of the system, the particular function, and the particular software or hardware systems or microprocessor or microcomputer systems being utilized.

In yet another embodiment, the disclosed methods may be partially implemented in software that can be stored on a storage medium, executed on programmed general-purpose computer with the cooperation of a controller and memory, a special purpose computer, a microprocessor, or the like. In these instances, the systems and methods of this invention can be implemented as a program embedded on personal computer such as an applet, JAVA® or CGI script, as a resource residing on a server or computer workstation, as a routine embedded in a dedicated measurement system, system component, or the like. The system can also be implemented by physically incorporating the system and/or method into a software and/or hardware system.

Although the present invention describes components and functions implemented in the embodiments with reference to particular standards and protocols, the invention is not limited to such standards and protocols. Other similar standards and protocols not mentioned herein are in existence and are considered to be included in the present invention. Moreover, the standards and protocols mentioned herein and other similar standards and protocols not mentioned herein are periodically superseded by faster or more effective equivalents having essentially the same functions. Such replacement standards and protocols having the same functions are considered equivalents included in the present invention.

The present invention, in various embodiments, configurations, and aspects, includes components, methods, processes, systems and/or apparatus substantially as depicted and described herein, including various embodiments, subcombinations, and subsets thereof. Those of skill in the art will understand how to make and use the present invention after understanding the present disclosure. The present invention, in various embodiments, configurations, and aspects, includes providing devices and processes in the absence of items not depicted and/or described herein or in various embodiments, configurations, or aspects hereof, including in the absence of such items as may have been used in previous devices or processes, e.g., for improving performance, achieving ease and\or reducing cost of implementation.

The foregoing discussion of the invention has been presented for purposes of illustration and description. The foregoing is not intended to limit the invention to the form or forms disclosed herein. In the foregoing Detailed Description for example, various features of the invention are grouped together in one or more embodiments, configurations, or aspects for the purpose of streamlining the disclosure. The features of the embodiments, configurations, or aspects of the invention may be combined in alternate embodiments, configurations, or aspects other than those discussed above. This method of disclosure is not to be interpreted as reflecting an intention that the claimed invention requires more features than are expressly recited in each claim. Rather, as the following claims reflect, inventive aspects lie in less than all features of a single foregoing disclosed embodiment, configuration, or aspect. Thus, the following claims are hereby incorporated into this Detailed Description, with each claim standing on its own as a separate preferred embodiment of the invention.

Moreover, though the description of the invention has included description of one or more embodiments, configurations, or aspects and certain variations and modifications, other variations, combinations, and modifications are within the scope of the invention, e.g., as may be within the skill and knowledge of those in the art, after understanding the present disclosure. It is intended to obtain rights which include alternative embodiments, configurations, or aspects to the extent permitted, including alternate, interchangeable and/or equivalent structures, functions, ranges or steps to those claimed, whether or not such alternate, interchangeable and/ or equivalent structures, functions, ranges or steps are disclosed herein, and without intending to publicly dedicate any patentable subject matter.

The invention claimed is:

1. A method of verifying an endpoint comprising:
 initiating a first communication to the endpoint, wherein the first communication requests a generated Dual-Tone Multi-Frequency ("DTMF") sequence from the endpoint;
 receiving and storing the generated DTMF sequence;
 receiving a second communication from the endpoint, the second communication at least including a DTMF sequence; and
 comparing the stored DTMF sequence and the DTMF sequence in the second communication and, upon a match, verifying an authenticity of the endpoint.

2. The method of claim 1, further comprising sending a request for secure feature access with the DTMF sequence in the second communication.

3. The method of claim 1, wherein the DTMF sequences include at least one special digit and a sequence of additional digits.

4. The method of claim 3, wherein the special digit cannot be dialed by a user.

5. The method of claim 1, wherein the endpoint is a communications device, a telephone, a speakerphone, a cellular phone, a SIP-enabled endpoint, a softphone, a PDA, a wired or a wireless communication device, or a VoIP phone.

6. The method of claim 1, wherein the sequences are included in a XML attachment.

7. The method of claim 1, further comprising mapping the endpoint to a destination endpoint.

8. The method of claim 1, further comprising granting secure feature access upon verification of the authenticity of the endpoint.

9. The method of claim 1, further comprising completing a call with a secure PBX function.

10. The method of claim 1, wherein the steps are embodied as computer executable instructions stored on a computer-readable media or are performed by one or more means.

11. The method of claim 1, wherein the generated DTMF sequence is a randomly generated DTMF sequence.

12. An endpoint verification architecture comprising:
 a Private Branch Exchange ("PBX") or communications server that initiates a first communication to an endpoint and requests a generated Dual-Tone Multi-Frequency ("DTMF") sequence, the requested DTMF sequence being received and stored by the PBX or communications server;
 a second communication sent from the endpoint, the second communication at least including a DTMF sequence; and
 a DTMF management module that compares the stored DTMF sequence and the DTMF sequence in the second communication and, upon a match, verifies an authenticity of the endpoint.

13. The architecture of claim 12, further comprising a request for secure feature access sent with the DTMF sequence in the second communication.

14. The architecture of claim 12, wherein the DTMF sequences include at least one special digit and a sequence of additional digits.

15. The architecture of claim 14, wherein the special digit cannot be dialed by a user.

16. The architecture of claim 12, wherein the endpoint is a communications device, a telephone, a speakerphone, a cellular phone, a SIP-enabled endpoint, a softphone, a PDA, a wired or a wireless communication device, or a VoIP phone.

17. The architecture of claim 12, wherein the sequences are included in a XML attachment.

18. The architecture of claim 12, wherein the communications server further maps the endpoint to a destination endpoint.

19. The architecture of claim 12, wherein the communications server grants secure feature access upon verification of the authenticity of the endpoint.

20. The architecture of claim 12, wherein the DTMF management module further completes a call with a secure PBX function.

* * * * *